United States Patent Office

3,333,954
Patented Aug. 1, 1967

3,333,954
MANUFACTURE OF INOCULANTS FOR CAST IRON
John Victor Dawson, Redditch, England, assignor to The British Cast Iron Research Association, Birmingham, England, a British company
No Drawing. Filed July 28, 1964, Ser. No. 385,763
Claims priority, application Great Britain, Aug. 10, 1963, 31,687/63
13 Claims. (Cl. 75—129)

This invention relates to the manufacture of inoculants for cast irons and has for an object to provide a relatively inexpensive process for the addition of strontium to ferrosilicon.

In the production of high-grade cast irons an important process is that of inoculation. This involves adding to the liquid iron, just prior to casting, a small amount of graphitising material. A very satisfactory inoculating substance is an alloy of iron and silicon known as ferrosilicon, which may have silicon contents ranging from about 40 percent to about 90 percent of silicon.

It has been found that provided the aluminium and calcium contents of ferrosilicon are kept low—preferably not exceeding 1.0% and 0.1% respectively—the presence of a small percentage of strontium in such ferrosilicon markedly improves the inoculating power of the alloy. The effect of strontium is analogous to, but stronger than, the well-known effect of aluminium in ferrosilicon. But strontium differs from aluminium since the simultaneous presence of calcium with the strontium nullifies its effect, whereas calcium enhances further the effect of aluminium. The simultaneous presence with strontium, of aluminium substantially within the foregoing limits sometimes has the additional effect of increasing the tensile strength of the alloy.

Strontium metal is not easy to extract from its principal ores, namely the carbonate (strontianite) and the sulphate (celestine), and it is consequently a relatively expensive metal, although its ores are relatively freely available. It is therefore not a commercial proposition to add metallic strontium to ferrosilicon during its production process for the purpose of producing the desirable alloy. It is also unlikely to lead to any useful result unless aluminium and calcium contaminants are kept to a low level during the production process. This is not economically feasible during the actual production process.

The manufacture of ferrosilicon normally takes place in an arc furnace, and it has been found possible to introduce strontium thereinto by charging strontium-rich minerals with the charge materials. But such addition of strontium-rich minerals directly to the charge is either wasteful or ineffective. It is wasteful in cases where slagging occurs because of the quantity of strontium which enters the slag which is subsequently discarded. If slag formation is at a minimum it is still ineffective because of the almost inevitable calcium and aluminium contamination above referred to.

The present invention is accordingly concerned with methods of introducing a few percent, and preferably not more than about 1.5 percent of strontium, into molten ferrosilicon having the necessary freedom from aluminium and calcium contaminants. The invention is based on the discovery that, under certain circumstances, strontium carbonate or strontium sulphate can be added to molten ferrosilicon and will react with it to introduce the required amount of strontium into the ferrosilicon.

For this reaction and resulting strontium uptake to proceed continuously it has been found desirable that the strontium-rich mineral should become, and remain during the material time, a mobile fluid. Strontium carbonate normally available commercially fairly readily melts and produces a relatively fluid slag, but strontium sulphate does this much more slowly; in either case the resulting slag thickens during the solution process.

The present invention accordingly provides a method of introducing strontium into a ferrosilicon inoculant substance for use in the production of high grade cast iron which comprises adding a strontium-rich material to molten ferrosilicon low in calcium and aluminium contaminants under conditions which cause the additive to remain as a mobile fluid for a period sufficient to cause the desired amount of strontium to enter the ferrosilicon.

The invention moreover provides for the addition of a strontium-rich material to molten ferrosilicon alloy having the aforesaid degree of purity at a temperature at least sufficient to initiate the reaction between the alloy and the material and at least maintaining said temperature until the desired uptake of strontium has been achieved.

The term "strontium-rich material" used herein, is defined as a strontium-rich mineral or a strontium-rich mineral admixed with a flux.

It may at times be necessary to increase the temperature during the reaction, in order to counteract the above-mentioned tendency of the slag progressively to thicken during the process.

As will be evident from the foregoing definition of strontium-rich material, an alternative and in some cases preferred procedure is to add a flux with the strontium-rich mineral. Such addition of flux may subsequently be repeated, and in any case, in such quantities, and at such intervals, as may be necessary to maintain the necessary mobility of the slag. The flux may be, for example, a carbonate of an alkali metal, sodium hydroxide or borax.

Advantageously, the flux may be added at the rate of between 5 percent and 50 percent by weight of the strontium-rich mineral, depending on the type of mineral and the temperature of reactants.

Most fluxes are normally reactive with the common refractories, as is the case with sodium hydroxide, and a carbonaceous refractory lining should normally be provided in the reaction vessel.

The addition of a flux such as, for example, sodium carbonate or hydroxide, potassium carbonate or borax makes it easily possible to maintain a mobile fluid slag and to continue the reaction to the required stage.

In a process according to the present invention, when starting with strontium carbonate as the strontium-rich material, sodium carbonate can be subsequently added as a flux in admixture with more strontium carbonate from time to time as the slag becomes thickened. When starting with strontium sulphate, however, it is necessary to use a mixture of strontium sulphate and flux—e.g. sodium carbonate—from the outset. Instead of sodium carbonate, potassium carbonate, lithium carbonate, or borax may be used. The quantity of flux to be mixed with the strontium-rich mineral will range from 5 to 50 percent according to the nature of the mineral and the temperature at which the reaction is allowed to proceed. Mixed strontium-rich minerals will form more mobile slags if they contain higher percentages of strontium carbonate or strontium oxide and less mobile ones if they contain higher percentages of strontium sulphate. The higher the reaction temperature the more mobile will be the slag and the faster the reaction. It is, in fact, preferable for the reaction temperature to exceed 1500° C. if possible. Any kind of stirring action will increase the speed of reaction. Stirring may suitably be carried out electro-magnetically when an electric induction furnace is employed, or by the stirring action of gas bubbled up through the melt from a porous plug in the base of the ladle. Alternatively, a plunger may be used.

The strontium content desired in the ferrosilicon will be achieved, for a given addition of strontium-rich material, by adjustment of the temperature of reaction and the time of reaction. It will normally lie within a period of five minutes to half an hour according to the dimensions of the reacting vessel.

All steps should be taken to avoid undue oxidation during the reaction.

It is important that the slag-forming strontium-rich materials should not contain more than 5 percent of calcium since this element will also be reduced into the ferrosilicon by the process according to the present invention and, as has already been stated, calcium is an undesirable element is strontium-containing ferrosilicon inoculants.

The following examples illustrate the present invention, the first being comparative as showing the effect of using strontium-rich material outside the conditions of the invention. In Examples 1 to 7, a 10-lb. charge of ferrosilicon containing 80 percent silicon and having low aluminium and calcium contents, was melted and held in the reaction vessel at between 1500° C. and 1600° C. for a period of five minutes after the addition of the strontium-rich material.

Example 1

5 percent by weight of strontium sulphate equivalent to 2.25 percent of strontium was added to the melt, but did not become fluid. The slag was removed at the end of five minutes and the ferrosilicon was analyzed. No strontium was found.

Example 2

An equal quantity of sodium carbonate viz, ½-lb., was added with the same weight of strontium sulphate as in Example 1. The slag became fluid very soon after addition. The slag was removed after five minutes and the ferrosilicon was analysed. 0.1 percent strontium was found.

Example 3

4 percent by weight of strontium as dried strontium carbonate was added under the same conditions as in Example 2, and the resultant ferrosilicon was found to contain 0.62 percent strontium.

Example 4

6.4 percent by weight of strontium as a 4:1 mixture of strontium sulphate and sodium hydroxide was added under the same conditions as in Example 2 and the resultant ferrosilicon was found to contain 0.5 percent strontium.

Example 5

9.6 percent by weight of strontium as a mixture of 15 parts strontium sulphate, 3 parts sodium carbonate, and 2 parts borax was added under the same conditions as in Example 2, and the resultant ferrosilicon was found to contain 0.5 percent strontium.

Example 6

8 percent by weight of strontium as dried strontium carbonate was added under the same conditions as in Example 2 and the resultant ferrosilicon was found to contain 1.1 percent strontium.

Example 7

10 percent by weight of strontium as a mixture of 7 parts strontium carbonate to 1 part lithium carbonate was added under the same conditions as Example 2. A very thin slag resulted which was left in contact for ten minutes. The resulting ferrosilicon contained 1.5 percent strontium.

Example 8

250 kg. ferrosilicon with low aluminium and calcium contents was raised to 1650° C. in a high frequency furnace with an acid lining. 15 percent strontium as dried strontium carbonate was carefully added to the surface of the melt during a period of about 1½ hours, in which time the temperature rose to 1700° C. Gentle plunging turbulence due to the high frequency field. The slag was applied and the mixing was encouraged by the and it had become fairly fluid by the end of melt due to its high content in silica. The resulting ferrosilicon contained 0.6 percent strontium.

Example 9

75 kg. of low aluminium and calcium ferrosilicon was raised to 1750° C. and tapped into a ladle fitted with a porous plug in its base. 20 kg. (equivalent to 16 percent strontium) strontium carbonate was very carefully added in small quantities while a very small argon flow was maintained through the plug to stir the metal. The ladle was closed with a lid, and again blown for four minutes. The reaction was very violent at first, but later moderated. The ferrosilicon had 1.2 percent strontium, being a yield of 7.5 percent of the strontium added.

Example 10

75 kg. of low aluminium and calcium ferrosilicon was raised to about 1700° C. and tapped into a porous plug ladle as in Example 9 above. 10 kg. strontium carbonate plus 1 kg. lithium carbonate (equivalent to 8 percent strontium) were added in several shovelfulls, while a small flow of argon was maintained. The ladle was closed and the argon flow maintained for three minutes by which time the reaction had virtually ceased. The reaction was much less violent than in Example 9 above. The ferrosilicon had 0.62 percent strontium, being a yield of 7.7 percent of the strontium added.

In Examples 3 and 6, where the additive consisted of strontinum carbonate alone, if the reaction time had been prolonged a flux addition would have been necessary to restore the necessary mobility of the slag.

I claim:

1. The method of introducing strontium into a ferrosilicon inoculant substance for use in the production of high grade cast iron which includes the steps of adding a strontium-rich material to molten ferrosilicon low in calcium and aluminum contaminants at a temperature sufficient to cause said strontium-rich material to remain as a mobile fluid for a period sufficient to cause the desired amount of strontium to enter the ferrosilicon.

2. The method of introducing strontium into a ferrosilicon inoculant substance for use in the production of high grade cast iron which comprises adding a strontium-rich material to molten ferrosilicon low in calcium and aluminum contaminants at a temperature at least sufficient to initiate the reaction between the ferrosilicon alloy and the additive and at least maintaining said temperature until the desired uptake of strontinum has been achieved.

3. The method of introducing strontium into a ferrosilicon inoculant substance for use in the production of high grade cast iron which includes the steps of adding a strontium-rich material to molten ferrosilicon alloy low in calcium and aluminum contaminants at a temperature at least sufficient to initiate the reaction between the molten ferrosilicon alloy and the additive and at least maintaining said temperature until the molten alloy has absorbed up to 1.5% of strontinum.

4. The method of introducing strontium into a ferrosilicon inoculant substance for use in the production of high grade cast iron which includes the steps of adding a strontium-rich material to molten ferrosilicon alloy low in calcium and aluminum contaminants at a temperature exceeding 1500° C. and maintaining the temperature above this level until the molten alloy has absorbed up to 1.5% of strontium.

5. The method of introducing strontium into a ferrosilicon inoculant substance for use in the production of high grade cast iron which includes the steps of adding a strontium-rich mineral and a flux to molten ferrosilicon alloy low in calcium and aluminum contaminants at a temperature exceeding 1500° C. and maintaining the temperature above this level until the molten alloy has absorbed up to 1.5% of strontium.

6. The method of introducing strontium into a ferrosilicon inoculant substance for use in the production of high grade cast iron which includes the steps of adding a strontium-rich mineral and a flux to molten ferrosilicon alloy low in calcium and aluminum contaminants at a temperature exceeding 1500° C., repeating as required the addition of at least one of the said additives during the reaction and maintaining the temperature above this level until the molten alloy has absorbed up to 1.5% of strontium.

7. The method of introducing strontium into a ferrosilicon inoculant substance for use in the production of high grade cast iron which includes the steps of adding a strontium-rich mineral and an alkali metal carbonate to molten ferrosilicon alloy low in calcium and aluminum contaminants at a temperature exceeding 1500° C. and maintaining the temperature above this level until the molten alloy has absorbed up to 1.5% of strontium.

8. The method of introducing strontium into a ferrosilicon inoculant substance for use in the production of high grade cast iron which includes the steps of adding a strontium-rich mineral and sodium hydroxide to molten ferrosilicon alloy low in calcium and aluminum contaminants at a temperature exceeding 1500° C. and maintaining the temperautre above this level until the molten alloy has absorbed up to 1.5% of strontium.

9. The method of introducing strontium into a ferrosilicon inoculant substance for use in the production of high grade cast iron which includes the steps of adding a strontium-rich mineral and borax to molten ferrosilicon alloy low in calcium and aluminum contaminants at a temperature exceeding 1500° C. and maintaining the temperature above this level until the molten alloy has absorbed up to 1.5% of strontium.

10. The method of introducing strontium into a ferrosilicon inoculant substance for use in the production of high grade cast iron which includes the steps of adding strontium carbonate to molten ferrosilicon alloy low in calcium and aluminum at a temperature exceeding 1500° C., subsequently adding a flux as required and maintaining the temperature above 1500° C. until the molten alloy has absorbed up to 1.5% of strontinum.

11. The method of introducing strontium into a ferrosilicon inoculant substance for use in the production of high grade cast iron which includes the steps of adding strontium sulphate and a flux to molten ferrosilicon alloy low in calcium and aluminum at a temperature exceeding 1500° C. and maintaining the temperature above this level until the molten alloy has absorbed up to 1.5% of strontium.

12. The method of introducing strontium into a ferrosilicon inoculant substance for use in the production of high grade cast iron which includes the steps of adding a strontium-rich mineral and from 5–50% of the weight thereof, of a flux to molten ferrosilicon alloy low in calcium and aluminum at a temperature exceeding 1500° C. and maintaining the temperature above this level until the molten alloy has absorbed up to 1.5% of strontium.

13. The method of introducing strontium into a ferrosilicon inoculant substance for use in the production of high grade cast iron which includes the steps of adding a strontium-rich mineral and from 5–50% of the weight thereof, of a flux to molten ferrosilicon alloy low in calcium and aluminum at a temperature exceeding 1500° C. and maintaining the temperature above this level while stirring the reactants until the molten alloy has absorbed up to 1.5% of strontium.

References Cited
UNITED STATES PATENTS

| | | | |
|---|---|---|---|
| 2,036,576 | 4/1936 | Hardy | 75—132 |
| 2,154,613 | 4/1939 | Guthrie | 75—57 X |
| 2,221,781 | 11/1940 | Critchett et al. | 75—58 |
| 2,494,238 | 1/1950 | Griggs et al. | 75—52 |
| 2,610,911 | 9/1952 | Udy | 75—130 X |
| 2,676,097 | 4/1954 | Strauss | 75—130 X |
| 2,821,476 | 1/1958 | Moore | 75—130 |

HYLAND BIZOT, *Primary Examiner.*

DAVID L. RECK, *Examiner.*

H. W. TARRING, *Assistant Examiner.*